(12) United States Patent
Ushijima et al.

(10) Patent No.: US 7,272,693 B2
(45) Date of Patent: *Sep. 18, 2007

(54) STORAGE SYSTEM AND BACK-UP METHOD FOR STORAGE SYSTEM

(75) Inventors: Takuma Ushijima, Atsugi (JP); Masato Kumagai, Hadano (JP); Eiichi Sato, Hiratsuka (JP); Toshio Komaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 123 days.

This patent is subject to a terminal disclaimer.

(21) Appl. No.: 10/852,218

(22) Filed: May 25, 2004

(65) Prior Publication Data

US 2005/0223170 A1    Oct. 6, 2005

(30) Foreign Application Priority Data

Mar. 31, 2004    (JP) .............................. 2004-102377

(51) Int. Cl.
*G06F 12/00* (2006.01)

(52) U.S. Cl. ..................... 711/162; 707/204; 714/20

(58) Field of Classification Search ................ 711/162; 707/204; 714/20
See application file for complete search history.

(56) References Cited

U.S. PATENT DOCUMENTS

| | | | |
|---|---|---|---|
| 6,269,381 B1 * | 7/2001 | St. Pierre et al. ........... | 707/202 |
| 6,434,683 B1 | 8/2002 | West et al. | |
| 6,636,954 B2 | 10/2003 | Maeda | |
| 6,651,075 B1 * | 11/2003 | Kusters et al. ............. | 707/204 |
| 6,779,003 B1 | 8/2004 | Midgley et al. | |
| 2002/0010762 A1 * | 1/2002 | Kodama ..................... | 709/219 |
| 2004/0093361 A1 | 5/2004 | Therrien et al. | |

FOREIGN PATENT DOCUMENTS

| | | |
|---|---|---|
| JP | 11-259348 | 1/1999 |
| JP | 2002-278819 | 3/2001 |

* cited by examiner

*Primary Examiner*—Brian R. Peugh
*Assistant Examiner*—Jared Rutz
(74) *Attorney, Agent, or Firm*—Reed Smith LLP; Stanley P. Fisher, Esq.; Juan Carlos A. Marquez, Esq.

(57) ABSTRACT

The present invention provides a storage system whereby it is also possible to back up the generational management information of a copy source disk array device.

The disk array device of the primary site manages back-up data of a main volume, in a plurality of generations, by means of differential snapshots. The differential data of the main volume and the main pool is transferred from the primary site to the secondary site, at a prescribed timing. The secondary site holds the secondary volume, which is a copy of the main volume, and a secondary pool which is a copy of the main pool. The primary site also transfers the generational management information to the secondary site. The generational management information may also comprise a differential bitmap table and a withdrawal destination address management table. The secondary site holds a copy of the generational management information. Thereby, it is possible to back up the whole of the data, including the generational management information, and hence protection against failure is improved.

13 Claims, 11 Drawing Sheets

| DIFFERENTIAL BITMAP | |
|---|---|
| BLOCK NO. | UPDATE FLAG |
| BLOCK 1 | 0 |
| BLOCK 2 | 1 |
| BLOCK 3 | 1 |
| ⋮ | ⋮ |
| BLOCK n | 0 |

153(253) GENERATIONAL MANAGEMENT INFORMATION

| WITHDRAWAL ADDRESS MANAGEMENT TABLE | |
|---|---|
| BLOCK NO. | WITHDRAWAL ADDRESS |
| BLOCK 1 | - |
| BLOCK 2 | ADDRESS 1 |
| BLOCK 3 | ADDRESS 2 |
| ⋮ | ⋮ |
| BLOCK n | - |

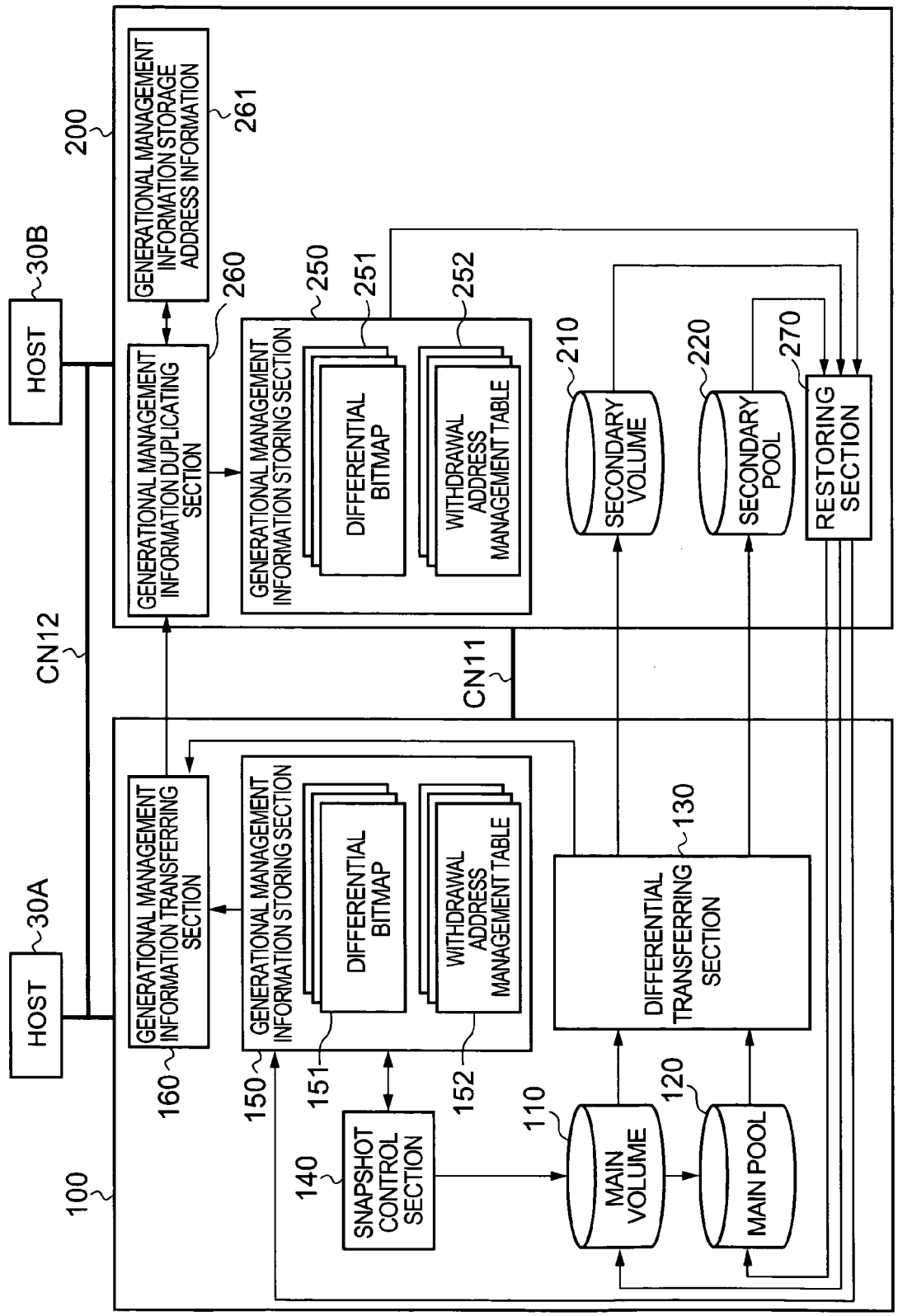

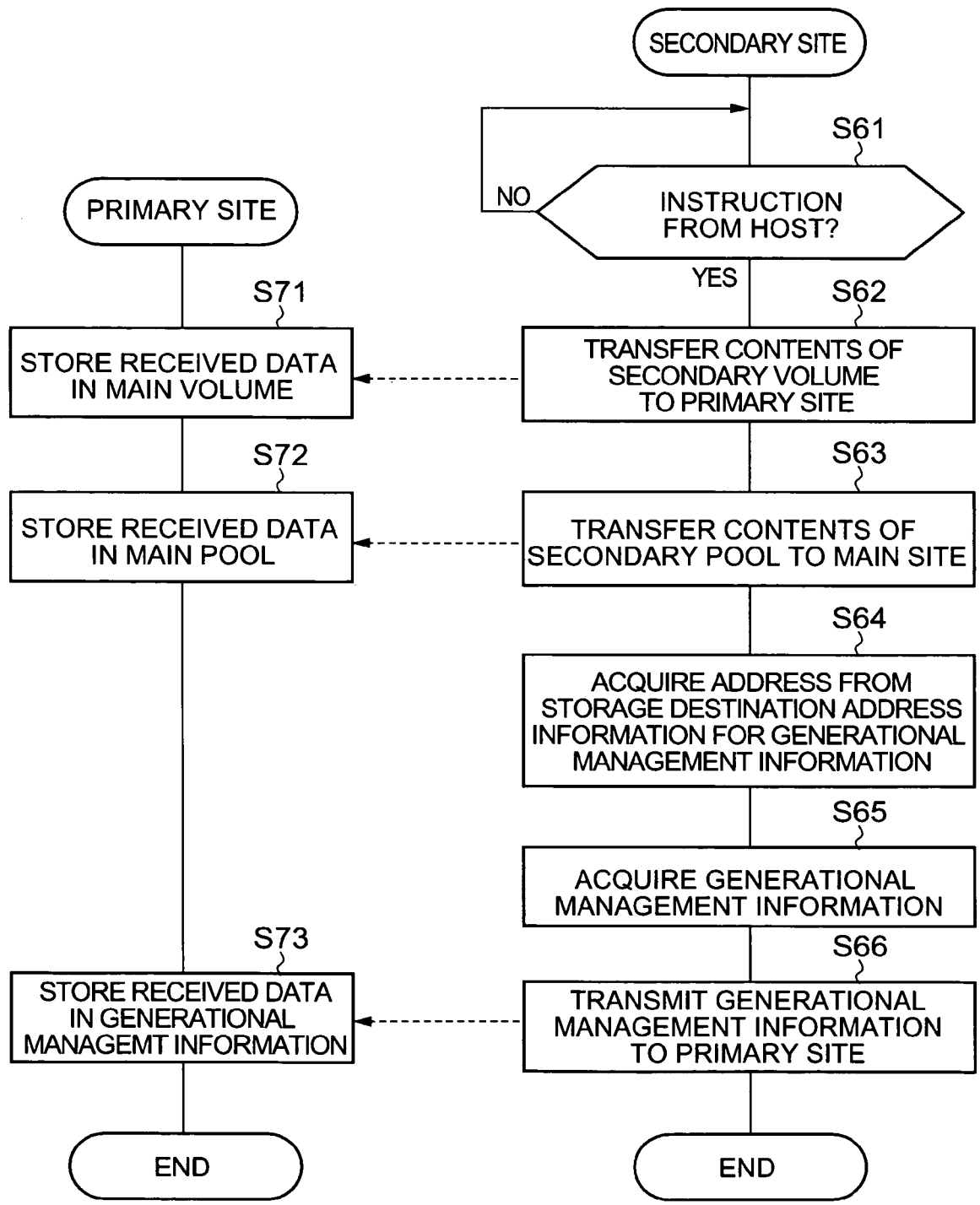

STORAGE SYSTEM AND BACK-UP METHOD FOR STORAGE SYSTEM

CROSS-REFERENCE TO RELATED APPLICATIONS

This application relates to and claims priority from Japanese Patent Application No. 2004-102377 filed on Mar. 31, 2004, the entire disclosure of which is incorporated herein by reference.

BACKGROUND OF THE INVENTION

1. Field of the Invention

The present invention relates to a storage system capable of generational management, and a back-up method for a storage system.

2. Description of the Related Art

For example, in various organizations, such as businesses, self-governing bodies, schools, or the like, large volumes of data of various different types are managed. These large volumes of data are managed by a storage system formed separately from a host computer. The storage system is constituted by comprising at least one or more storage device, such as a disk array device, for example.

A disk array device is constituted by arranging storage devices, such as hard disk drives, or semiconductor memory devices, for example, in an array configuration. The disk array device provides a storage region based on a RAID (Redundant Array of Independent Inexpensive Disks).

In the storage system, by managing the storage contents of a main volume, separately from the main volume, provision is made for cases in which data in the main volume is lost, or the like. For example, as one such method, a technique is known whereby the contents of the volume at a prescribed point in time are saved, by copying the storage contents of the main volume, exactly, to a secondary volume (Japanese Patent Laid-open No. (Hei)11-259348). In another such method, a technique is also known whereby an image (snapshot), which takes a static impression of the main volume at a prescribed point in time, is acquired, in such a manner that the data of the main volume can be managed in a plurality of generations (Japanese Patent Laid-open No. 2002-278819).

If the storage contents of the main volume are copied exactly to another volume, then a back-up volume of the same volume of the main volume is required, in order to store back-up data for a single generation. Consequently, if the back-up data is managed by means of a plurality of generations, then a large number of volumes are required and hence the back-up costs increase. Moreover, each time a new-generation volume is created, then it is necessary to execute an initial copy for transferring the whole volume, and hence the system load increases.

If the storage contents at a particular point in time are taken as a reference, and a differential snapshot is used to manage the differential only, then the required storage contents are relatively small compared to the aforementioned method, and back-up data can be managed in the form of a plurality of generations. However, the actual data used for managing generations on the basis of differential snapshots is not backed up, and there only exists one version of this data. Furthermore, the data for generational management cannot serve the purpose of data back-up on its own. The user is able to restore the data of a desired generation by referring to both the main volume forming the reference, and the data used for generational management.

Therefore, if a fault occurs in the main volume, it is not possible to restore data simply by means of the data for generational management in the differential snapshot. Furthermore, in the event that the data for generational management has been lost, it becomes impossible to revert to the storage contents of the main volume at a prescribed point of time in the past.

SUMMARY OF THE INVENTION

The present invention was devised with the foregoing problems in view, one object thereof being to provide a storage system and a back-up method for a storage system whereby it is possible also to back up generational management information from a copy source, to a copy destination. It is a further object of the present invention to provide a storage system whereby data management of a plurality of data generations is carried out respectively in both a copy source and a copy destination.

In order to achieve the aforementioned object, in the present invention, it is possible to manage data of a plurality of generations, respectively, in both a copy source and a copy destination, by also backing up the generational management information of the copy source disk array device to the copy destination disk array device.

The storage system according to the present invention comprises a first disk array device and a second disk array device mutually connected. (1) The first disk array device comprises: a first volume; a first withdrawal volume for storing data withdrawn from the first volume; a generational management control section for generating generational management information which records the storage contents of the first volume at a prescribed point in time, in the form of differential data, and managing generations of back-up data in the first volume; a first storing section for storing the generational management information generated by the generational management control section; a generational management information transferring section for transferring the generational management information stored in the first storing section to the second disk array device; and a volume transferring section for respectively transferring the storage contents of the first volume and the first withdrawal volume, to the second disk array device. (2) The second disk array device comprises: a second volume to which the storage contents of the first volume received from the volume transferring section are copied; a second withdrawal volume to which the storage contents of the first withdrawal volume received from the volume transferring section are copied; and a generational management information duplicating section which causes the generational management information received from the generational management information transferring section to be copied to a second storing section.

Here, the first disk array device and the second disk array device may be respectively constituted by comprising, for example, a channel adapter for controlling transmission and reception of data to and from an external device (a corresponding display device or host computer), a disk adapter for controlling transmission and reception of data to and from a storage device providing a storage volume, and a memory shared by the aforementioned channel adapter and disk adapter (a cache memory or control memory). When data is withdrawn from the first volume to the first withdrawal volume, for example, the disk adapter reads out the data to be withdrawn, temporarily, to the cache memory, and then writes the data to a prescribed position in the first withdrawal volume. Furthermore, if the first volume is copied to a second volume, or if the first withdrawal volume is copied to a second withdrawal volume, then the disk adapter reads out the data to be copied, to the cache memory. The channel adapter reads in the data from the cache memory, and transmits it to the copy destination disk array device, via a communications network.

The generational management information may be constituted by a set of a plurality of partial information elements, such as a differential bitmap table, or a withdrawal destination address management table, or the like, for example. A differential bitmap table contains information for managing whether or not data has been updated, with respect to each demarcated block of a prescribed size. The withdrawal destination address management table is used for managing the address to which the data prior to updating is withdrawn.

According to the composition described above, the main volume, the first withdrawal volume and the generational management information are each copied respectively to the second disk array device forming the copy destination. Therefore, the back-up data can be managed respectively in a plurality of generations, in both the first disk array device forming the copy source, and the second disk array device forming the copy destination.

Moreover, the generational management information records the storage contents of the first volume in the form of differential data. Therefore, in contrast to a method in which the contents of the volume at any given point in time are copied completely and exactly, only the difference with respect to the previous generation needs to be managed, for example, and therefore the amount of storage capacity required for back up can be reduced, and the data transfer time can also be shortened.

In the present embodiment, the volume transfer section is composed in such a manner that it can transmit the differential in the first volume and the differential in the first withdrawal volume, respectively to the second disk array device. Transmitting the differential of the volume means, for example, that only the portion that has changed in comparison to the contents in the case of the previous transmission (namely, the differential), is transmitted. By copying the differential only in this way, it is possible to reduce the amount of data transferred.

In the present embodiment, the transfer of the respective differentials of the first volume and the first withdrawal volume by means of the volume transferring section, and the transfer of the generational management information by means of the generational management information transferring section are respectively carried out simultaneously. Thereby, the management of the respective generations of the first disk array device (copy source) and the second disk array device (copy destination) can be synchronized.

In the present embodiment, prior to transferring the generational management information to the second disk array device, the generational management information transferring section reports the data size of the respective partial information elements constituting the generational management information, respectively, to the generational management information duplicating section, and the generational management information duplicating section manages the storage position of the generational management information on the basis of the data size of each partial information element. For example, the partial information, such as the differential bitmap table, the withdrawal destination address management table, and the like may be stored in a distributed fashion in a plurality of storage devices, such as the memory, disks, or the like, of the first disk array device.

Alternatively, the respective partial information elements may be stored respectively in different locations of the same storage device. By previously reporting the data size of each partial information element, from the generational management information transferring section to the generational management information duplicating section, the generational management information duplicating section is able to reserve a storage area for storing the respective partial information elements, and to manage the storage positions of the respective partial information elements.

In the present embodiment, the generational management information transferring section is composed in such a manner that it can transfer the generational management information for any previously selected generation, to the second disk array device.

In the present embodiment, a generation restoring section is provided in the second disk array device for restoring the storage contents of a designated generation, by referring to the second volume and the second withdrawal volume, on the basis of the generational management information copied to the second storing section.

In the present embodiment, a restoring section capable of transferring the storage contents respectively stored in the second volume, the second withdrawal volume and the second storing section, to the first disk array device, is provided in the second disk array device.

The present invention may also be realized in the form of a computer program for causing the first disk array device to execute prescribed functions (generational management control functions, generational management information transfer functions, volume transfer functions), or a computer program for causing the second disk array device to execute prescribed functions (generational management information duplication functions, generation restoring functions, restoring functions). This program may, for example, be distributed by being recorded onto a storage medium of various types, such as a hard disk device, a semiconductor memory device, or the like. Alternatively, this program may be distributed by means of a communications network, for example.

Further objects of the present invention will become apparent from the following description of the embodiments.

BRIEF DESCRIPTION OF THE DRAWINGS

FIG. 5 is an illustrative diagram showing the composition of tables, wherein (a) shows a differential bitmap table, and (b) shows a withdrawal destination address management table;

FIG. 10 is a block diagram of a storage system relating to a third embodiment of the present invention; and FIG. 11 is a flowchart showing processing for restoring a volume, or the like.

DESCRIPTION OF THE PREFERRED EMBODIMENTS

Below, embodiments of the present invention are described with respect to the drawings. In the present embodiment, as described hereinafter, a plurality of disk array devices, each constituted by a plurality of channel adapters, a plurality of disk adapters, a cache memory, a shared memory, and the like, are connected mutually. By also backing up the generational management information of the copy source disk array device onto the copy destination disk array device, it is possible to manage back-up data, for a plurality of generations, in the copy source and the copy destination, respectively.

The present embodiment discloses a back-up method for a storage system comprising: a step of transmitting the back-up data of a main volume, from a first disk array device to a second disk array device, and storing same in the second disk array device, and a step of transmitting generational management information used for generational management, from the first disk array device to the second disk array device, and storing same in the second disk array device.

Figure 1:
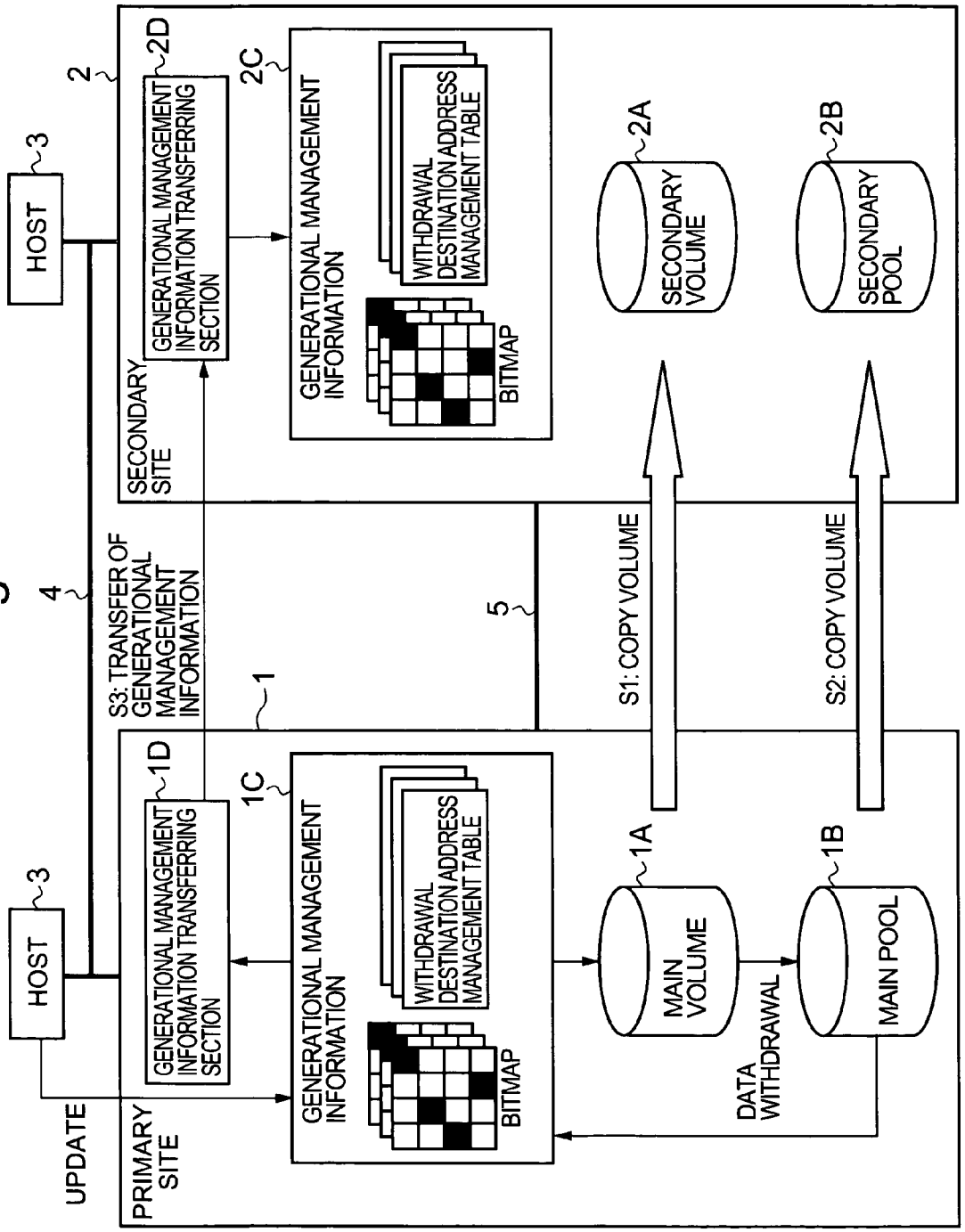
FIG. 1 is an illustrative diagram showing an overview of an embodiment of the present invention.

FIG. 1 is an illustrative diagram showing an overview of the present embodiment. This storage system comprises a primary site 1 having a copy source disk array device, and a secondary site 2 having a copy destination disk array device. An example of the specific composition of a disk array device is described in more detail below. The primary site 1 holds, for example, a data group used by the current server (host computer). The secondary site 2 is used as a back-up site for the primary site 1, for example. The primary site 1 and the secondary site 2 may be respectively provided inside frames which are physically separate, for example. Alternatively, for example, the primary site 1 and the secondary site 2 may be provided respectively within the same frame.

For example, a host computer 3 constituted as a server is able to access both sites 1 and 2, respectively. By setting up access control, it is also possible to achieve a composition wherein only a particular host computer is able to access a particular site. The respective host computers 3 and the respective sites 1, 2 are connected by means of a communications network 4. The respective sites 1, 2 are connected mutually by means of a separate communications network 5. The communications network 4 may be constituted by a LAN (Local Area Network), or the like, for example. The communications network 5 may be constituted by a SAN (Storage Area Network), or the like, for example.

The primary site 1 may comprise, for example, a main volume 1A, a main pool 1B, generational management information 1C, and a generational management information transferring section 1D. The main volume 1A is a logical storage region for storing data used by the host computer 3. The main pool 1B is a logical storage region used for withdrawing the original data, before the data in the main volume 1A is updated. The generational management information 1C acquires a static image of the main volume as a prescribed point in time, on the basis of a snapshot acquisition request from the user. This snapshot is acquired in the form of a differential snapshot which obtains the differential created by the change in the data. The generational management information transferring section 1D transfers the generational management information 1C to the secondary site 2.

The secondary site 2 may comprise, for example, a secondary volume 2A, a secondary pool 2B, generational management information 2C, and a generational management information duplicating section 2D. The secondary volume 2A forms a copy pair with the main volume 1A. The main volume 1A and the secondary volume 2A are synchronized. The secondary pool 2B forms a copy pair with the main pool 1B, and it stores the storage contents of the main pool 1B. The main pool 1B and the secondary pool 2B are synchronized. The generational management information 2C is generated by copying the generational management information 1C to the secondary site 2. The generational management information duplicating section 2D receives the generational management information 1C from the generational management information transferring section 1D and copies the information.

This storage system executes operations of the following kind. Firstly, the storage contents of the main volume 1A are copied to the secondary volume 2A (S1). Thereupon, the storage contents of the main pool 1B are copied to the secondary pool 2B (S2). Here, when the respective volumes are synchronized, the storage contents of the copy source volumes 1A, 1B at a particular point in time are respectively copied, exactly, to the copy destination volumes 2A, 2B (initial copy), and thereafter, only the difference generated after completion of the initial copy is copied (differential copy).

A host computer 3 accesses the main volume 1A and updates the data therein. Accordingly, the storage contents of the main volume 1A change occasionally, from time to time. In the primary site 1, the storage contents of the main volume 1A are managed for a plurality of generations. In other words, each time a snapshot acquisition request is issued by the user, the storage contents of the main volume 1A at that respective point in time (generation) are managed.

After creating a copy of the main volume 1A and the main pool 1B in the secondary site 2 (S1, S2), generational management information 1C is transmitted from the primary site 1 to the secondary site 2 (S3). By this means, generational management information 2C is created and stored in the secondary site 2.

Thereby, it is possible to manage back-up data for a plurality of generations of the main volume 1, in both the primary site 1 and the secondary site 2.

1. First Embodiment

Firstly, an example of a disk array device provided respectively in the primary site and the secondary site is described, whereupon the unique composition according to the present invention is described. The disk array device in the primary site and the disk array device in the secondary site may also have different compositions.

Figure 2:
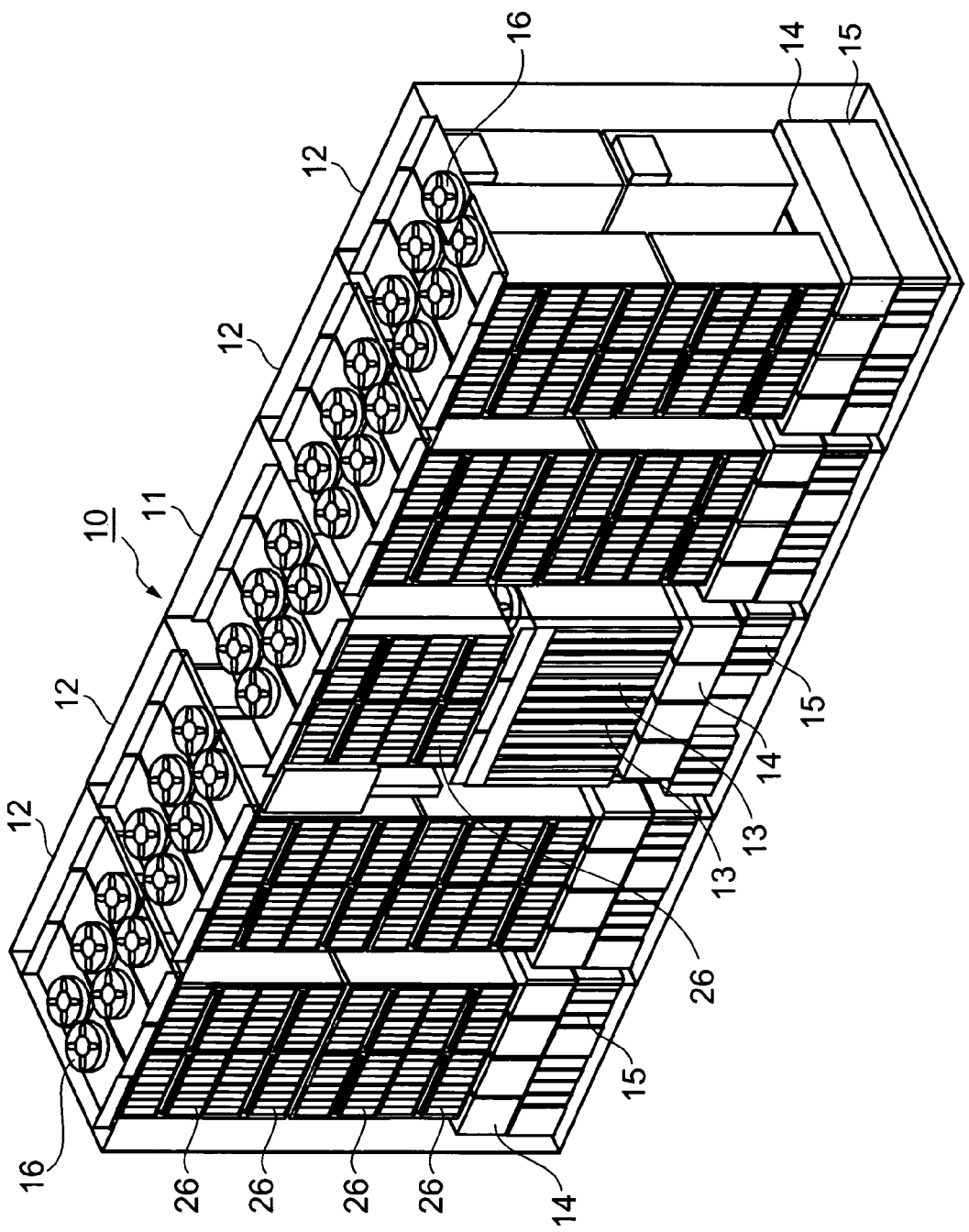
FIG. 2 is an external view of a disk array device which can be used in the present invention.

FIG. 2 is a general oblique view showing the external composition of a disk array device 10. The disk array device 10 may be constituted, for example, by a base frame body 11 and a plurality of add-on frame bodies 12.

The base frame body 11 is the smallest compositional unit of the disk array device 10, and it is provided with both storage functions and control functions. The add-on frame bodies 12 are optional items of the disk array device 10, and are controlled by means of the control functions provided in the base frame body 11. For example, it is possible to connect a maximum of four add-on frame bodies 12 to the base frame body 11.

The base frame body 11 comprises a plurality of control packages 13, a plurality of power supply units 14, a plurality of battery units 15, and a plurality of disk drives 26, provided respectively in a detachable fashion. A plurality of disk drives 26, a plurality of power supply units 14 and a plurality of battery units 15 are provided detachably in the add-on frame bodies 12. Moreover, a plurality of cooling fans 16 are also provided respectively in the base frame body 11 and the respective add-on frame bodies 12.

The control packages 13 are modules for respectively realizing the channel adapters (hereinafter, CHA) 21, disk adapters (hereinafter, DKA) 22 and cache memory 23, and the like, described hereinafter. More specifically, a plurality of CHA packages, a plurality of DKA packages, and one or more memory package are provided in a detachable fashion in the base frame body 11, in such a manner that they can be exchanged in package units.

Figure 3:
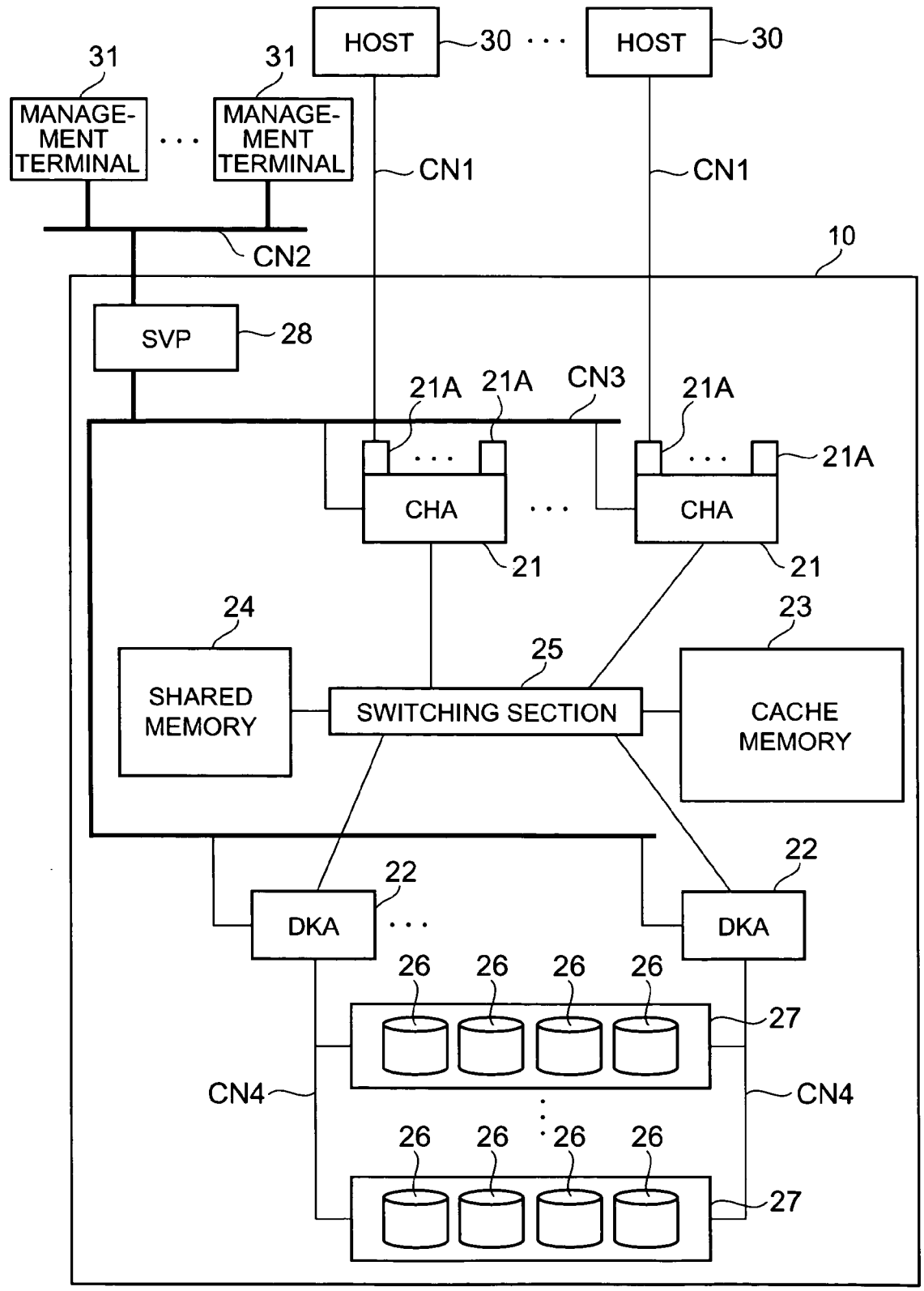
FIG. 3 is a block diagram showing an example of the composition of a disk array device.

FIG. 3 is a block diagram showing a general overview of a disk array device 10. The disk array device 10 can be connected respectively to a plurality of host computers 30, in a mutually communicable fashion, via a communications network CN1.

The communications network CN1 is, for example, a LAN, SAN, the Internet or a dedicated circuit, or the like. If a LAN is used, then the data transfer between the host computer 30 and the disk array device 10 is conducted in accordance with a TCP/IP protocol. If a SAN is used, data transfer is conducted between the host computer 30 and the disk array device 10 in accordance with a fiber channel protocol.

Furthermore, if the host computer 30 is a mainframe computer, then data transfer is conducted in accordance with a communications protocol, such as FICON (Fibre Connection: registered trademark), ESCON (Enterprise System Connection: registered trademark), ACONARC (Advanced Connection Architecture: registered trademark), FIBARC (Fibre Connection Architecture: registered trademark), or the like.

Each of the host computers 30 is constituted, for example, by a server, personal computer, workstation, mainframe computer, or the like. For example, the respective host computers 30 are connected via a separate communications network to a plurality of client terminals, which are situated outside the range of the drawing. The respective host computers 30 provide services to the respective client terminals, by reading or writing data, from or to the disk array device 10, in response to requests from the respective client terminals, for example.

Each of the CHAs 21 controls data transfer with the respective host computers 30, and is provided with a communications port 21A. 32 CHAs 21, for example, can be provided in the disk array device 10. A CHA 21 is prepared, for example, in accordance with the type of host computer 30, such as an open CHA, a main frame CHA, or the like, for example.

Each CHA 21 receives commands and data requesting data read out, or writing, from the host computer 30 connected respectively thereto, and operates in accordance with the commands received from the host computer 30.

To describe the operation of the CHA 21 and that of the DKA 22, in advance, when the CHA 21 receives a read command from the host computer 30, this read command is stored in the shared memory 24. The DKA 22 refers to the shared memory 24 occasionally, and if it discovers an unprocessed read command, then it reads out the data from the disk drive 26, and stores this data in the cache memory 23. The CHA 21 reads out the data transferred to the cache memory 23, and then transmits the data to the host computer 30.

On the other hand, if the CHA 21 receives a write command from the host computer 30, then it stores this write command in the shared memory 24. Moreover, the CHA 21 stores the received data (user data) to the cache memory 23. When the CHA 21 has stored the data in the cache memory 23, it then reports completion of writing to the host computer 30. The DKA 22 reads out the data stored in the cache memory 23, in accordance with the write command stored in the shared memory 24, and stores this data in the prescribed disk drive 26.

Each of the DKAs 22 may be provided in a plural fashion, for instance, comprising 4 or 8 adapters, in the disk array device 10. Each DKA 22 respectively controls data communications with a particular disk drive 26. The respective DKAs 22 and the respective and the respective disk drives 26 are connected by means of a communications network CN4, such as a SAN, for example, and perform data transfer in block units, in accordance with a fiber channel protocol. Each DKA 22 monitors the state of the corresponding disk drive 26 occasionally, and the result of this monitoring operation is transmitted via the internal network CN3, to the SVP 28.

The respective CHAs 21 and the respective DKAs 22 are provided respectively with a printed circuit board on which a processor, memory, and the like, are mounted, and a control program stored in the memory, for example, (neither of these elements being depicted in the drawings), and they respectively achieve prescribed functions by means of combined operation of these hardware and software elements.

The cache memory 23 stores user data, and the like, for example. The cache memory 23 is constituted by a non-volatile memory, for example. When a volume copy, or a differential copy, or the like, is performed, the data to be copied is read out to the cache memory 23, and it is then transferred from the cache memory 23 to the copy destination, by means of either the CHA 21 or DKA 22, or alternatively, by means of both the CHA 21 and the DKA 22.

The shared memory (or the control memory) 24 is constituted by a non-volatile memory, for example. Control information, management information, and the like, is stored in the shared memory 24, for example. The shared memory 24 and cache memory 23 may respectively be provided in a plural fashion. Furthermore, it is also possible to provide both a cache memory 23 and a shared memory 24 on the same memory board. Alternatively, one portion of the memory may be used as a cache region and another portion thereof may be used as a control region.

The switching section 25 respectively connects together the respective CHAs 21, the respective DKAs 22, the cache memory 23 and the shared memory 24. Thereby, all of the CHAs 21 and the DKAs 22 may respectively access the cache memory 23 and the shared memory 24. The switching section 25 may be constituted as an ultra-high-speed crossbar switch, or the like, for example.

A plurality of disk drives 26 may be installed in the disk array device 10. Each of the disk drives 26 can be realized in the form of a hard disk drive (HDD), a semiconductor memory device, or the like, for example.

A disk drive 26 is a physical storage device. Although the situation varies depending on the RAID composition, or the like, a RAID group 27 which is a virtual logical region is constructed on a physical storage region provided by one group of four disk drives 26, for example. Moreover, one or more virtual logical devices (LU: Logical Unit) can be established in a RAID group 27.

The storage resources used by the disk array device 10 do not all have to be provided inside the disk array device 10. The disk array device 10 is able to incorporate and use storage resources existing externally to the disk array device 10, exactly as if there were its own storage resources.

The service processor (SVP) 28 is connected respectively to each of the CHAs 21 and the DKAs 22, by means of an internal network CN3, such as a LAN. Furthermore, the SVP 28 may be connected to a plurality of management terminals 31, by means of a communications network CN2, such as a LAN. The SVP 28 accumulates the respective states inside the disk array device 10, and provides this information to the management terminal 31.

Figure 4:
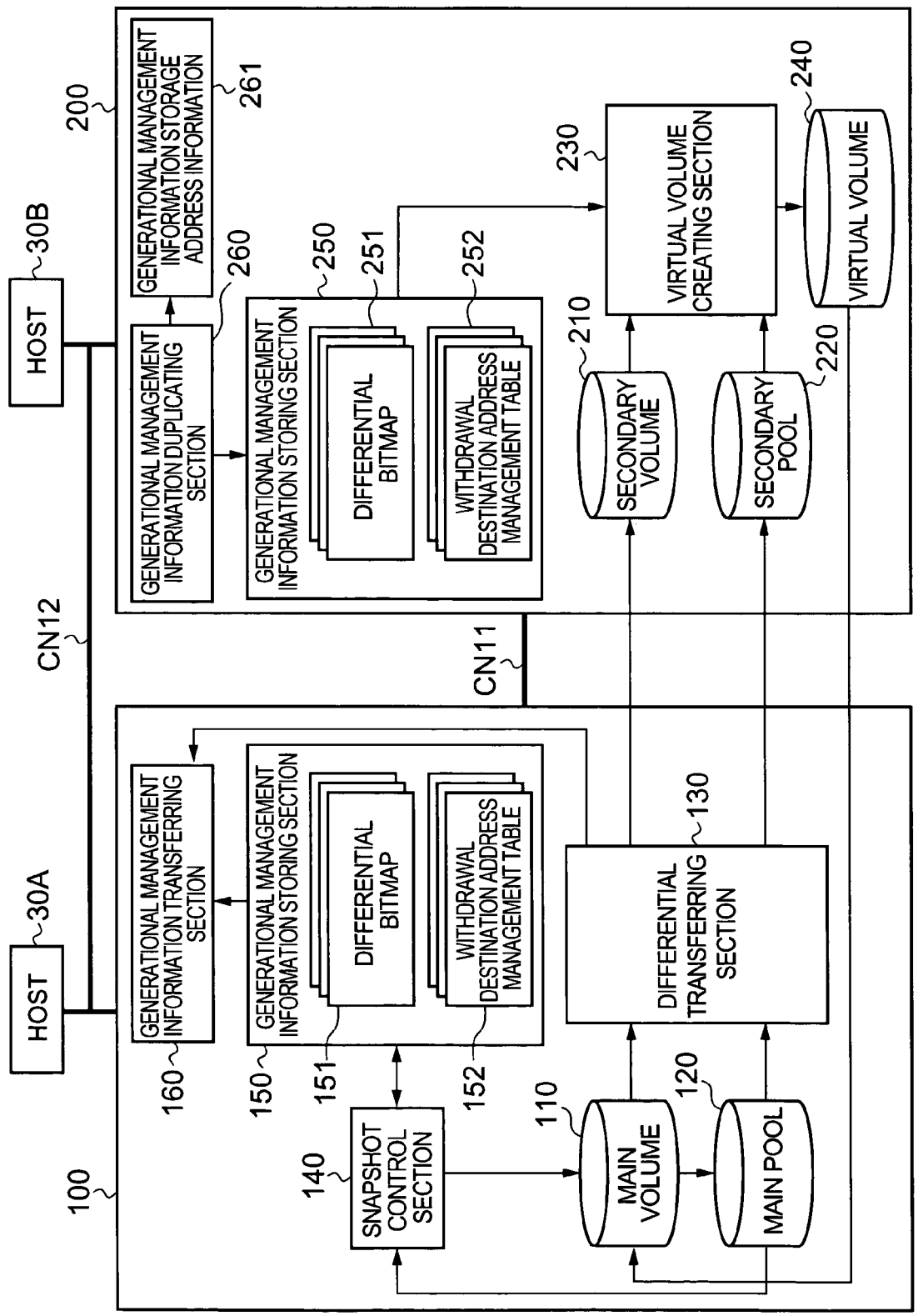
FIG. 4 is a block diagram showing the overall composition of a storage system in which all data, including generational management information in the copy source, is backed up to a disk array device forming a copy destination.

FIG. 4 is a block diagram showing the main composition of a storage system for carrying out back up including generational management information. The storage system is constituted by connecting a copy source disk array device 100 provided in the primary site and a copy destination disk array device 200 provided in the secondary site. The respective disk array devices 100, 200 may each be provided with the composition described above with reference to FIG. 2 and FIG. 3, for example.

The respective disk array devices 100 and 200 are connected together by means of a communications network CN11, such as a SAN, or the like, for example. Furthermore, the respective disk array devices 100, 200 and the host computers (hereinafter, "hosts") 30A, 30B are connected by means of a communications network CN12, such as a LAN, SAN, or the like, for example. The host 30A accesses the disk array device 100 of the primary site. The host 30B accesses the disk array device 200 of the secondary site. Where there is no need to distinguish between the primary host 30A and the secondary host 30B, these devices are referred to simply as "host 30".

The disk array device 100 comprises a main volume 110, a main pool 120, a differential transfer section 130, a snapshot control section 140, a generational management information storing section 150, and a generational management information transferring section 160.

The main volume 110 is a volume for storing a group of data used by the host 30A. The main pool 120 is a volume for saving data withdrawn from the main volume 110. The differential transfer section 130 serves to transfer the respective differential data in the storage contents of the main volume 110 and the main pool 120, to the disk array device 200 of the secondary site. The differential transfer section 130 may be realized, for example, by means of a processor provided in the CHA 21 executing micro code for differential transfer, for example. Here, for example, it is possible to transfer a plurality of differential data elements, together, once a prescribed amount of differential data has been accumulated, or when a prescribed time has been reached, or the like.

The snapshot control section 140 manages data by acquiring a snapshot of the main volume 110, on the basis of an instruction (user instruction) from the host 30A. A snapshot may be a volume snapshot in which the whole of the volume is copied, exactly, or it may be a differential snapshot in which only the differential from the time at which the previous snapshot was created, is controlled. The snapshot control section 140 creates a differential snapshot.

The storage contents of the main volume 110 at a prescribed point in time can be managed by means of a differential bitmap table 151 and a withdrawal destination address management table 152 stored in the generational management information storing section 150, for example. As shown in FIG. 5, for example, it is possible to constitute the generational management information 153 by means of the differential bitmap table 151 and the withdrawal destination address management table 152. The generational management information 153 is respectively created for each generation of data. The generational management information 153 does not have to be stored in the same storage device, and it may also be stored in a distributed fashion in different storage devices.

The differential bitmap table 151 can be understood as a table which associates flag information indicating an updated status or a non-updated status, respectively, to each of a plurality of blocks achieved by dividing the main volume 110 into blocks of a prescribed size, for example.

The withdrawal destination address management table 152 can be constituted by associating each block of the main volume 110, with a withdrawal address indicating whereabouts in the main pool 120 the data stored in that block is to be withdrawn to, for example. The composition of the generational management information 153 illustrated in FIG. 5 is simply an example, and differential snapshots of the main volume 110 can be managed by means of various methods.

The generational management information transferring section 160 transmits the generational management information 153 stored in the generational management information transferring section storing section 150, to the disk array device 200 of the secondary site. The generational management information transferring section 160 transmits the generational management information 153 at approximately the same timing as that at which the differential transfer section 130 transmits the respective differential data of the main volume 110 and the main pool 120.

The secondary disk array device 200 may comprise a secondary volume 210, a secondary pool 220, a virtual volume creating section 230, a virtual volume 240, a generational management information storing section 250, and a generational management information duplicating section 260.

The secondary volume 210 forms a copy pair with the main volume 110. The storage contents of the main volume 110 are copied to the secondary volume 210. The secondary pool 220 forms a copy pair with the main pool 120. The storage contents of the main pool 120 are copied to the secondary pool 220.

The virtual volume creating section 230 generates a virtual volume 240 for the designated generation, on the basis of an instruction from the host 30. The virtual volume creating section 230 refers to the secondary volume 210 and the secondary pool 220, on the basis of the generational management information 253 stored in the generational management information storing section 250, and creates a virtual volume 240 which reproduces the storage contents of the designated generation, in a virtual manner.

The generational management information storing section 250 stores the generational management information 253. This generational management information 253 is a copy of the generational management information 153 of the primary site. Therefore, the generational management information 253 comprises, for example, a differential bitmap table 251, which is a copy of the differential bitmap table 151, and a withdrawal destination address management table 252 which is a copy of the withdrawal destination address management table 152.

The generational management information duplicating section 260 stores the generational management information 253 in the generational management information storing section 250, on the basis of data received from the generational management information transferring section 160 of the primary site. As described hereinafter, the generational management information duplicating section 260 establishes and manages a storage destination address for the generational management information 253, on the basis of the data size of the generational management information 153 reported by the generational management information transferring section 160. The storage destination of the generational management information 253 is recorded in the generational management information storage destination address information 261.

Figure 6:
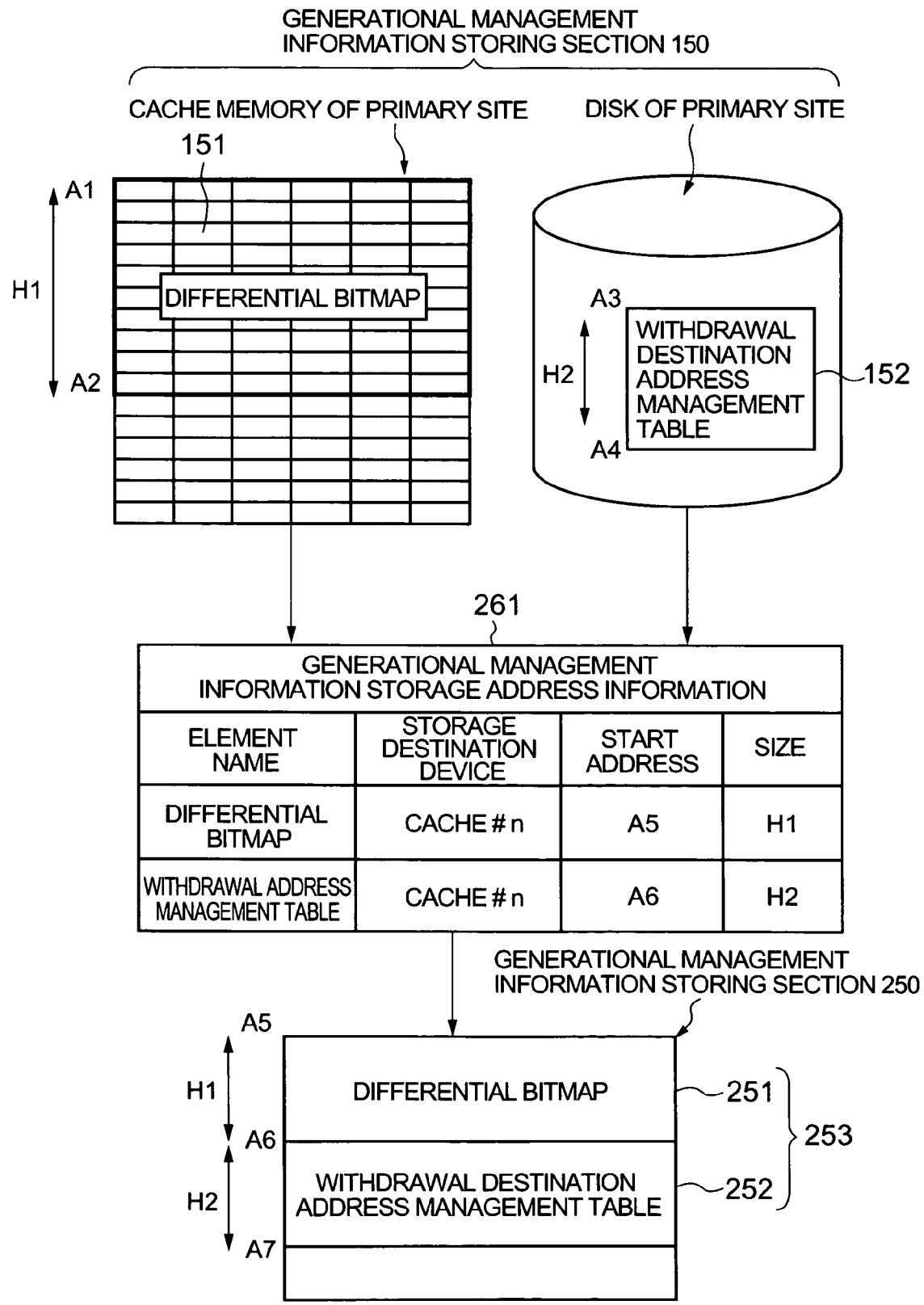
FIG. 6 is an illustrative diagram showing a schematic view of the copying of generational management information.

FIG. 6 is an illustrative diagram showing a schematic view of the process of storing generational management information 253 in the generational management information storing section 250. Firstly, the respective partial information elements (differential bitmap table 151, withdrawal destination address management table 152) constituting the generational management information 153 are stored respectively in a distributed fashion, in the disk array device 100 of the primary site.

For example, the differential bitmap table 151 is stored in the cache memory of the disk array device 100. Moreover, for example, the withdrawal destination address management table 152 is stored in a prescribed disk.

The generational management information transferring section 160 acquires the respective data sizes of the differential bitmap table 151 and the withdrawal destination address management table 152 constituting the generational management information 153, when transferring the generational management information 153. The generational management information transferring section 160 previously reports the data sizes of the respective tables 151, 152, to the generational management information duplicating section 260, before transferring the generational management information 153.

Upon receiving the data sizes of the respective tables 151, 152, the generational management information duplicating section 260 reserves the storage region required for copying the generational management information 153, in the generational management information storing section 250. The generational management information duplicating section 260 stores a differential bitmap table 251, which is a copy of the differential bitmap table 151, and a withdrawal destination address management table 252, which is a copy of the withdrawal destination address management table 152, respectively, in the reserved storage region. The generational management information duplicating section 260 records the storage positions of the respective tables 251, 252, in the generational management information storage destination address information 261.

The generational management information storage destination address information 261 is formed by associating, for example, the name of the element constituting the generational management information (the name of the partial information), information for identifying the destination storage device (for example, the device number, or the like), a header address, and a data size. FIG. 6 shows a case where the respective tables 151, 152 stored in a distributed fashion in the disk array device 100 are stored together in the cache memory of the disk array device 200. It is also possible to adopt a composition wherein the tables 251, 252 in the generational management information 253 are stored in a distributed fashion in the disk array device 200. Furthermore, the storage destination device in the generational management information 253 is not limited to being a cache memory, and may also be one or a plurality of disks.

Figure 7:
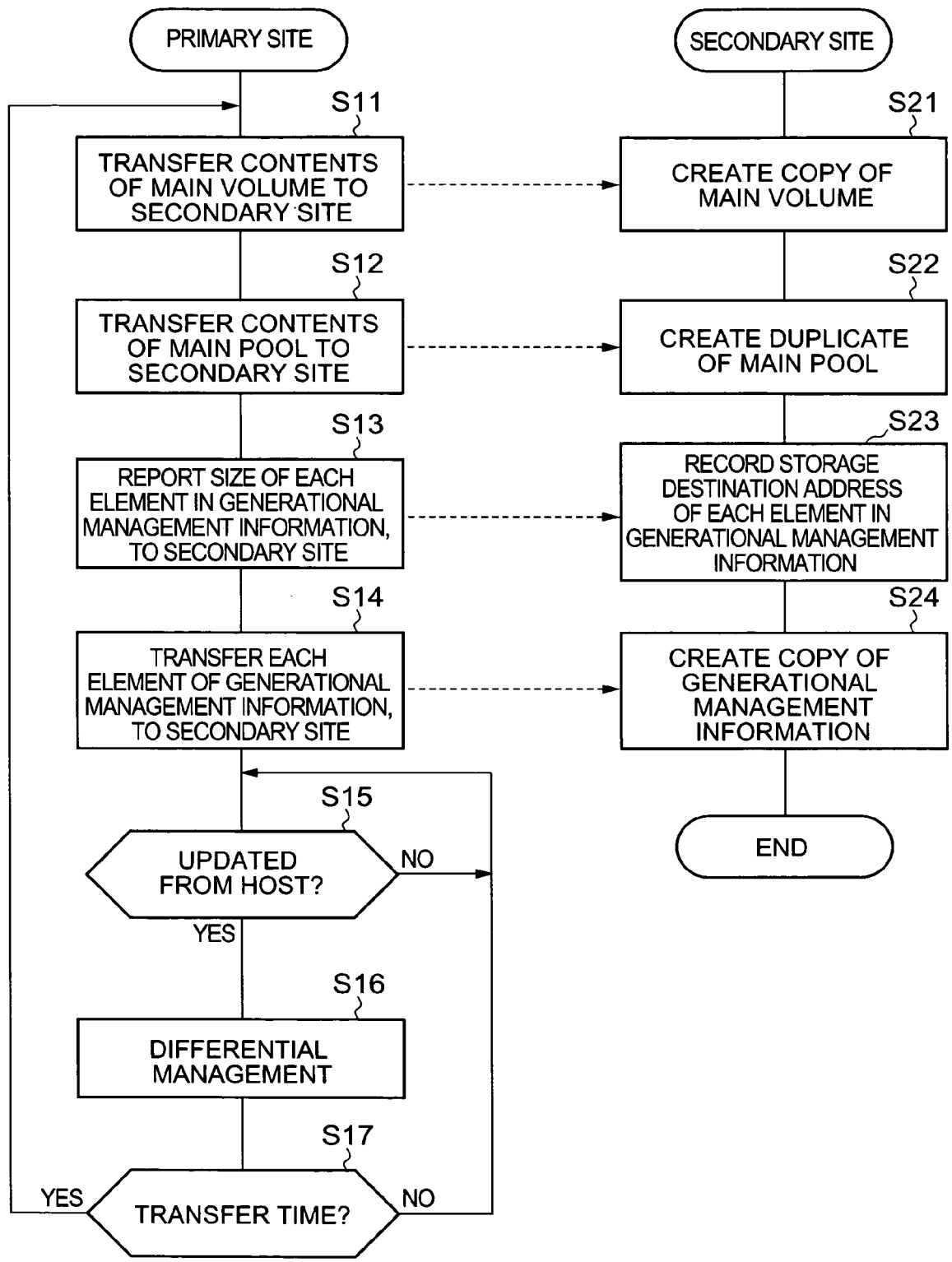
FIG. 7 is a flowchart showing back-up processing.

The outline of processing in the storage system is now described with reference to FIG. 7 and FIG. 8. FIG. 7 is a flowchart showing an overview of back-up processing for backing up data to a secondary site, including the generational management carried out in the primary site.

Firstly, the disk array device 100 transfer the storage contents of the main volume 110, to the disk array device 200 (S11). Thereupon, the disk array device 100 transfers the storage contents of the main pool 120 to the disk array device 200 (S12).

Upon receiving the data of the main volume 110, the disk array device 200 of the secondary site stores this data in a prescribed position of the secondary volume 210, and thereby creates a copy of the main volume 110 (S21). Moreover, upon receiving the data of the main pool 120, the disk array device 200 of the secondary site stores this data in a prescribed position of the secondary pool 220, and thereby creates a copy of the main pool 120 (S22).

The disk array device 100 in the primary site acquires the respective data sizes of the differential bitmap table 151 and the withdrawal destination address management table 152 constituting the generational management information 153, and it reports these respective data sizes to the disk array device 200 (S13).

The disk array device 200 of the secondary site reserves the required storage region, on the basis of the data size of the differential bitmap table 151 and the data size of the withdrawal destination address management table 152. The disk array device 200 records the storage destination addresses of the differential bitmap table 251 and the withdrawal destination address management table 252, in the generational management information storage destination address information 261 (S23).

The disk array device 100 in the primary site transmits the data of the differential bitmap table 151 and the withdrawal destination address management table 152 constituting the generational management information 153, respectively, to the disk array device 200 (S14).

The disk array device 200 in the secondary site creates respective copies of the differential bitmap table 151 and the withdrawal destination address management table 152, on the basis of the data thus received, and it stores these copies at prescribed positions in the generational management information storing section 250 (S24).

The disk array device 100 of the primary site monitors data update requests from the host 30 (S15). If there has been an update request (S15: YES), then the disk array device 100 manages the differential generated by this update (S16). If, for example, the amount of differential data reaches a prescribed volume, or if a prescribed transfer timing has been reached, (S17: YES), then the disk array device 100 repeats the processing in S11-S14.

Here, the differential management carried out in S16 will be described in simple terms. When the host 30 seeks to update data in the main volume 110, the disk array device 100 refers to the differential bitmap table 151 which manages the most recent snapshot of the main volume 110. If the update flag for the data block to be updated has already been set to on (set to "1"), then the original data stored in that data block has already been withdrawn to the main pool 120. Consequently, in this case, the disk array device 100 writes over the new data, without withdrawing the data in the main volume 110.

If the update flag for the data block to be updated is set to off (if it is set to "0"), then it is necessary for the data stored in that data block to be withdrawn before overwriting the data. Therefore, the disk array device 100 reads out the data stored in the data block to be copied, from the main volume 110, and copied the data to the main pool 120. Once copying has been completed, the disk array device 100 records the withdrawal destination address of the data, in the withdrawal destination address management table 152. Furthermore, the disk array device 100 sets the update flag for that block in the differential bitmap table 151, to on.

Figure 8:
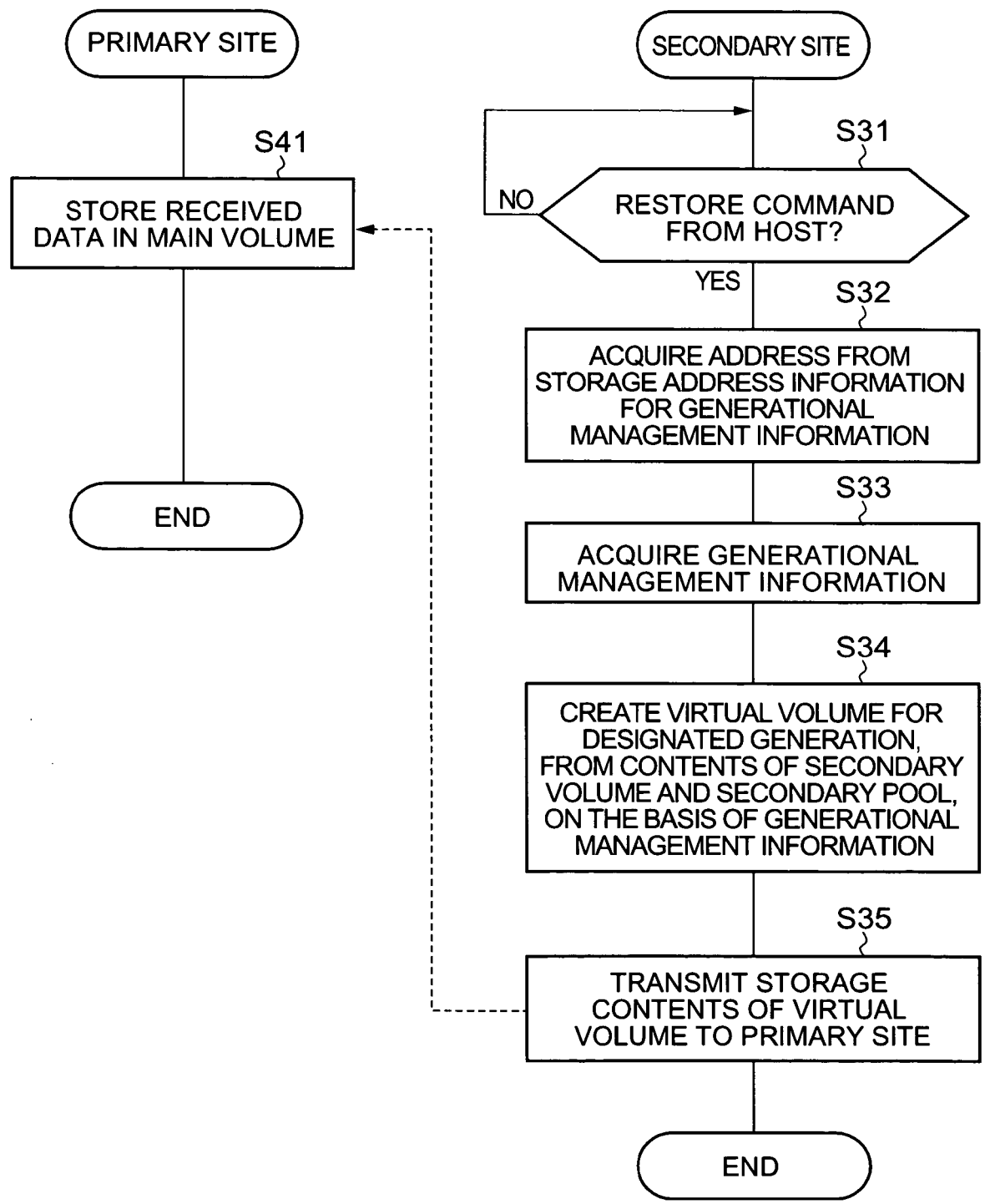
FIG. 8 is a flowchart showing processing for creating a virtual volume.

FIG. 8 is a flowchart showing an overview of generation restore processing. Firstly, the disk array device 200 in the secondary site monitors whether or not there has been an instruction to restore a data generation, from the host 30 (S31).

If an instruction has been received from the host 30 indicating that a virtual volume for the prescribed generation is to be created (S31: YES), then the disk array device 200 refers to the generational management information storage destination address information 261, and acquires the respective storage addresses of the differential bitmap table 251 and the withdrawal destination address management table 252 (S32). The disk array device 200 acquires the generational management information 253 (the differential bitmap table 251 and the withdrawal destination address management table 252), from the generational management information storing section 250 (S33).

On the basis of the generational management information 253, the disk array device 200 creates a virtual volume 240 of the generation designated by the host 30, from the storage contents of the secondary volume 210 and the secondary pool 220 (S34). Here, the virtual volume 240 is, for example, a read out conversion table for restoring the storage contents of the designated generation, in a virtual fashion. It is recorded in the virtual volume 240 which of the secondary volume 210 and the secondary pool 220 the target data is stored in. If the target data is stored in the secondary volume 210, then this data is read out from the secondary volume 210. If the target data is stored in the secondary pool 220, then this data is read out from the secondary pool 220.

When creating a virtual volume 240 for the designated generation, the disk array device 200 causes all or a portion of that virtual volume 240 to be transmitted to the disk array device 100 in the primary site (S35).

The disk array device 100 in the primary site then stores the data received from the disk array device 200 of the secondary site, in the main volume 110 (S41).

By adopting the composition described above, the present embodiment has the following beneficial effects. In the present embodiment, a composition was adopted wherein the generational management information in the copy source is also backed up to the copy destination. Therefore, it is possible to manage the back-up data for a plurality of generations, in the back-up destination (copy destination) also. By this means, protection against failure can be increased.

In the present embodiment, a composition is adopted wherein management of a plurality of data generations is carried out on the basis of differential snapshots, in the disk array device 100 in the copy source, and all data, including the generational management information 153 for these respective generations, is backed up to the disk array device 200 in the copy source. Therefore, it is possible to manage a plurality of data generations by means of a small volume data capacity, in comparison with cases where the whole volume is copied for each generation.

2. Second Embodiment

Figure 9:
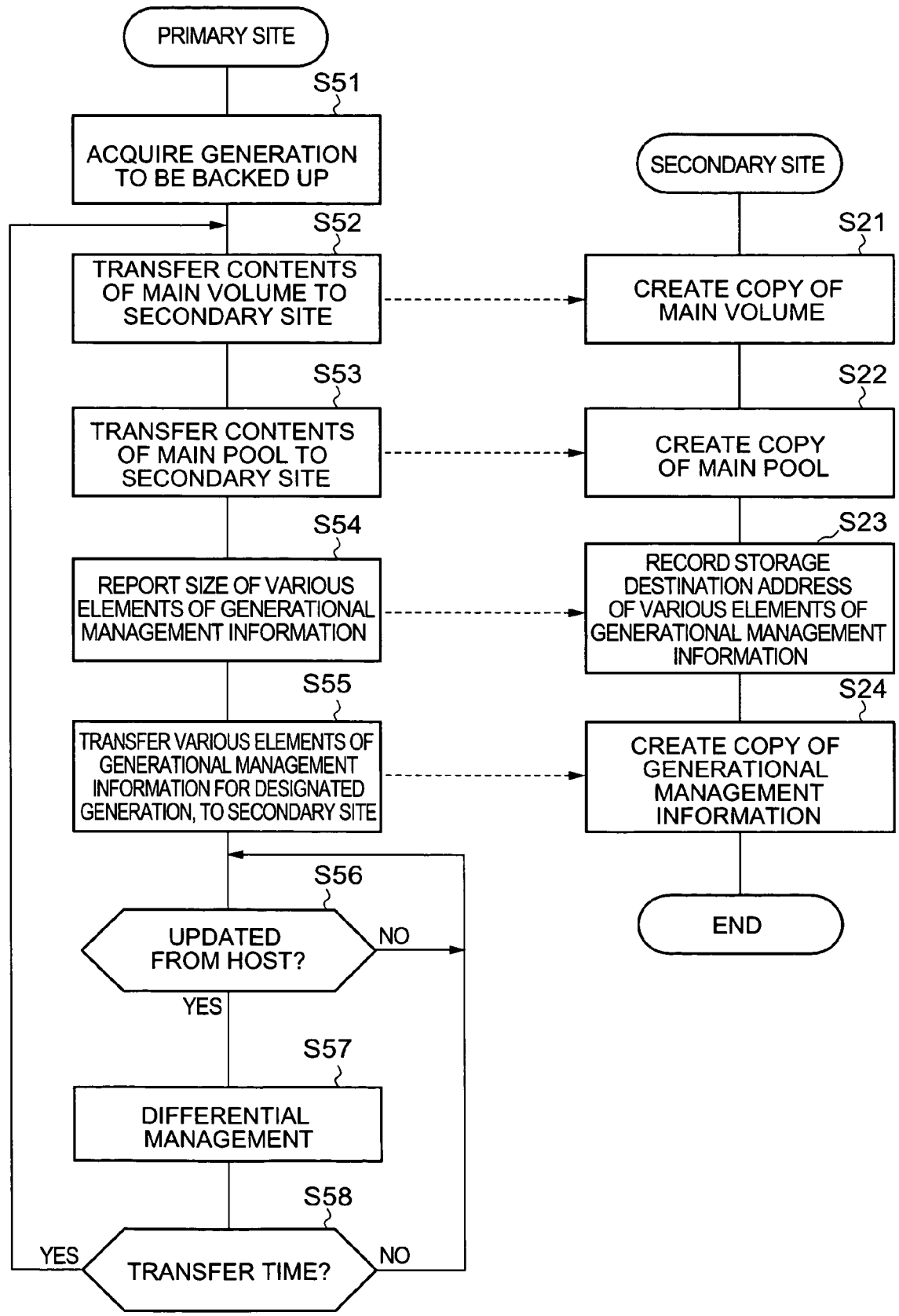
FIG. 9 is a flowchart showing back-up processing relating to a second embodiment of the present invention.

A second embodiment is now described on the basis of FIG. 9. The present embodiment is equivalent to a modification example of the first embodiment. The characteristic feature of the present embodiment lies in the fact that only the back-up data for a previously designated generation is transferred to the secondary site and held in same.

FIG. 9 is a flowchart showing an overview of back-up processing. Firstly, the disk array device 100 of the primary site acquires the generation to be backed up (S51). The generation for which data is to be backed up can be instructed to the disk array device 100 by the host 30.

The disk array device 100 transmits the respective storage contents of the main volume 110 and the main pool 120, to the disk array device 200 in the secondary site (S52, S53). Thereupon, the disk array device 100 respective acquires the data sizes of the differential bitmap table 151 and the withdrawal destination address management table 152 contained in the generational management information 153 relating to the designated generation. The disk array device 100 respectively reports the data sizes of the tables 151, 152, to the disk array device 200 (S54). The disk array device 100 transmits the contents of the differential bitmap table 151 and the withdrawal destination address management table 152 relating to the designated generation, to the disk array device 200 (S55).

The disk array device 100 monitors update requests from the host 30 (S56), and if an update request has been issued, then the differential generated in the main volume 110 is managed (S57). When a prescribed transfer timing has arrived (S58: YES), the disk array device 100 repeats the processing in steps S52-S55.

In this way, in the present embodiment, it is possible to cause the generational management information 153, or the like, relating to the generation designated by the host 30, to the disk array device 200 of the secondary site, and hence ease of use is improved. A composition is adopted wherein, when the storage contents of the main pool 120 are transferred to the disk array device 200, only the portion relating to the storage contents of a generation designated by the user is transferred.

3. Third Embodiment (Third Embodiment)

A third embodiment is now described on the basis of FIG. 10 and FIG. 11. The present embodiment is equivalent to a modification example of the first embodiment. The characteristic feature of the present embodiment lies in the fact that copies of a main volume, a main pool, and respective generational management information, held in the copy destination are transferred to the copy source, on the basis of an instruction from the user.

FIG. 10 is an approximate block diagram showing the general composition of a storage system. The disk array device 200 in the secondary site comprises a restoring section 270. In FIG. 10, in order to facilitate the description, the virtual volume creating section 230 is omitted from the drawing.

As shown in FIG. 11 as well, the restoring section 270 respectively transfers the storage contents of the secondary volume 210, the storage contents of the secondary pool 220, and the generational management information 253, to the disk array device 100 of the primary site, thereby respectively restoring the main volume 110, the main pool 120 and the generational management information 153.

FIG. 11 is a flowchart showing an overview of restore processing. When the disk array device 200 of the secondary site detects a restore instruction from the host 30 (S61: YES), it transfers the storage contents of the secondary volume 210 to the disk array device 100 (S62). The disk array device 100 of the primary site stores the data received from the disk array device 200, in the main volume 110, and thereby restores the main volume 110 (S71).

Thereupon, the disk array device 200 of the secondary site transfers the storage contents of the secondary pool 220 to the disk array device 100 (S63). The disk array device 100 of the primary site stores the data received from the disk array device 200, in the main pool 120, and thereby restores the main pool 120 (S72).

The disk array device 200 refers to the generational management information storage address information 261, and acquires the storage address of the generational management information 253 (S64). The disk array device 200 respectively acquires the differential bitmap table 251 and the withdrawal destination address management table 252, from the generational management information storing section 250, on the basis of the acquired address (S65). The disk array device 200 transmits the contents of the differential bitmap table 251 and the withdrawal destination address management table 252, respectively, to the disk array device 100 (S66).

The disk array device 100 of the primary site stores the data received from the disk array device 200, in a prescribed position of the generational management information storing section 150, and thereby restores the generational management information 153 (S73).

In this way, in the present embodiment, the copies of the main volume 110 and the main pool 120 and the copy of generational management information 153 held in the copy destination disk array device 200 are respectively returned to the copy source disk array device 100.

The present invention is not limited to the embodiments described above. It is possible for a person skilled in the art to make various additions, modifications, or the like, without departing from the scope of the present invention.

What is claimed is:

1. A storage system connected to a host computer comprising a first disk array device and a second disk array device mutually connected, wherein (1) said first disk array device comprises:

a first volume;

a first withdrawal volume for storing data withdrawn from said first volume;

a generational management control section for generating generational management data which record the storage contents of said first volume at a prescribed point in time, in the form of differential data, and for managing generations of back-up data in said first volume;

a first storing section for storing said generational management data generated by said generational management control section;

a generational management data transferring section for transferring said generational management data stored in said first storing section to said second disk array device; and a volume transferring section for respectively transferring the storage contents of said first volume and said first withdrawal volume, to said second disk array device, said volume transferring section and said generational management data transferring section transferring respective data substantially simultaneously; and (2) said second disk array device comprises:

a second volume to which the storage contents of said first volume received from said volume transferring section are copied;

a second withdrawal volume to which the storage contents of said first withdrawal volume received from said volume transferring section are copied; and a generational management data duplicating section which causes said generational management data received from said generational management data transferring section to be copied to a second storing section, wherein the first disk array device backs-up to the second disk array device the first volume of only one designated generation on the basis of an instruction from the host computer to be restored thereafter, and the second disk array device restores the first volume of said only one designated generation on the basis of an instruction from the host computer.

2. The storage system according to claim 1, wherein said volume transferring section is able to transmit the differential of said first volume and the differential of said first withdrawal volume, respectively, to said second disk array device.

3. The storage system according to claim 2, wherein the transfer of the respective differentials of said first volume and said first withdrawal volume by said volume transferring section, and the transfer of said generational management data by said generational management data transferring section, are carried out respectively in a synchronous fashion.

4. The storage system according to claim 1, wherein said generational management data is constituted by a plurality of partial information elements.

5. The storage system according to claim 4, wherein said generational management data transferring section respectively reports the data sizes of the individual partial information elements constituting said generational management data, to said generational management data duplicating section, before transferring said generational management data to said second disk array device; and said generational management data duplicating section manages the storage position of said generational management data, on the basis of the data sizes of said respective partial information elements.

6. The storage system according to claim 1, where said generational management data transferring section is able to transfer the generational management data for any previously selected generation, to said second disk array device.

7. The storage system according to claim 1, wherein a generational restoring section for restoring the storage contents of a designated generation, by referring to said second volume and said second withdrawal volume, on the basis of said generational management data copied to said second storing section, is provided in said second disk array device.

8. The storage system according to claim 1, wherein a restoring section capable of transferring the storage contents respectively stored in said second volume, said second withdrawal volume and said second storing section, to said first disk array device, is provided in said second disk array device.

9. The storage system according to claim 1, wherein when the second disk array device is instructed by the instruction to restore the first volume of the designated generation, the second disk array device creates a virtual volume associated to either the second volume or the second withdrawal volume that stores a target data for restoring the first volume of the designated generation, and copies the target data stored in either the second volume or the second withdrawal volume to the first volume of the first disk array device.

10. The storage system according to claim 1, wherein when the first disk array device is instructed by the instruction from the host computer, only a target data for backing-up the first volume of the designated generation is transferred from the first disk array device to the second disk array device.

11. A storage system connected to a host computer comprising a first disk array device and a second disk array device which are connected with each other, wherein (1) the first disk array device comprises:
a first volume;
a first withdrawal volume for storing data withdrawn from the first volume;
a generation management control section for generating generational management data which records the storage contents of the first volume at a predetermined point in time, in the form of differential data, and for managing generations of backup data of the first volume;
a first storage section, which comprises a plurality of storage devices, for storing the generational management data generated by the generation management control section said generational management data including a plurality of partial information items which are stored in the plurality of storage devices in a distributed fashion;
a generational management data transferring section for transferring the generational management data stored in the first storage section to the second disk array device; and
a volume transferring section for transferring the storage contents of the first volume and of the first withdrawal volume to the second disk array device respectively, said volume transferring section and said generational management data transferring section transferring respective data substantially simultaneously, (2) the second disk array device comprises:
a second volume to which the storage contents of the first volume received from the volume transferring section are copied;
a second withdrawal volume to which the storage contents of the first withdrawal volume received from the volume transferring section are copied; and a generational management data duplicating section for causing the generational management data received from the generational management data transferring section to be copied collectively to a second storage section, wherein the generational management data transferring section reports the data sizes of the respective partial information items constituting the generational management data, to the generational management data duplicating section, before transferring the generational management data to the second disk array device, and the generational management data duplicating section secures a storage region, in the second storage section, for storing the individual partial information items collectively, on the basis of the data sizes of the respective partial information items, and manages the storage position of the generational management data, and wherein the first disk array device backs-up to the second disk array device the first volume of only one designated generation on the basis of an instruction from the host computer to be restored thereafter, and the second disk array device restores the first volume of said only one designated generation on the basis of an instruction from the host computer.

12. The storage system according to claim 11, wherein when the second disk array device is instructed by the instruction to restore the first volume of the designated generation, the second disk array device creates a virtual volume associated to either the second volume or the second withdrawal volume that stores a target data for restoring the first volume of the designated generation, and copies the target data stored in either the second volume or the second withdrawal volume to the first volume of the first disk array device.

13. The storage system according to claim 11, wherein when the first disk array device is instructed by the instruction from the host computer, only a target data for backing-up the first volume of the designated generation is transferred from the first disk array device to the second disk array device.

* * * * *

UNITED STATES PATENT AND TRADEMARK OFFICE
CERTIFICATE OF CORRECTION

PATENT NO.         : 7,272,693 B2
APPLICATION NO.    : 10/852218
DATED              : September 18, 2007
INVENTOR(S)        : Ushijima et al.

It is certified that error appears in the above-identified patent and that said Letters Patent is hereby corrected as shown below:

Title Page;

Please delete the recitation of "This patent is subject to a terminal disclaimer." in the (*) Notice paragraph on the cover page as follows:

~~"This patent is subject to a terminal disclaimer."~~

Signed and Sealed this

Twenty-seventh Day of November, 2007

JON W. DUDAS
*Director of the United States Patent and Trademark Office*